(12) United States Patent
Kruglick

(10) Patent No.: US 9,515,902 B2
(45) Date of Patent: Dec. 6, 2016

(54) DATACENTER BORDER-ISSUED ANALYTICS FOR MONITORING FEDERATED SERVICES

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 396 days.

(21) Appl. No.: 14/114,732

(22) PCT Filed: Apr. 17, 2013

(86) PCT No.: PCT/US2013/037015
§ 371 (c)(1),
(2) Date: Oct. 29, 2013

(87) PCT Pub. No.: WO2014/171938
PCT Pub. Date: Oct. 23, 2014

(65) Prior Publication Data
US 2014/0317273 A1    Oct. 23, 2014

(51) Int. Cl.
*G06F 15/173* (2006.01)
*H04L 12/26* (2006.01)
*H04L 12/24* (2006.01)

(52) U.S. Cl.
CPC ........... *H04L 43/04* (2013.01); *H04L 41/5096* (2013.01)

(58) Field of Classification Search
CPC ....... G06F 9/445; H04L 67/10; H04L 43/04; H04L 41/5096
USPC ...................................................... 709/224
See application file for complete search history.

(56) References Cited

U.S. PATENT DOCUMENTS

| | | | |
|---|---|---|---|
| 6,070,190 A | 5/2000 | Reps et al. | |
| 6,920,112 B1 | 7/2005 | Mccloghrie et al. | |
| 7,987,262 B2* | 7/2011 | Tung | G06F 9/5072 709/217 |
| 2006/0106866 A1 | 5/2006 | Green et al. | |
| 2007/0047468 A1* | 3/2007 | Sumiyoshi | H04L 41/0803 370/254 |

(Continued)

OTHER PUBLICATIONS

Barton, "Amazon, Eucalyptus Team on Hybrid Cloud", http://www.wired.com/insights/2012/03/amazon-eucalyptus/, Created on Mar. 22, 2012.

(Continued)

*Primary Examiner* — Tauqir Hussain
*Assistant Examiner* — Javier O Guzman
(74) *Attorney, Agent, or Firm* — Turk IP Law, LLC

(57) ABSTRACT

Technologies are generally described for providing datacenter border-issued analytics for monitoring federated services. In some examples, a deployment manager, which manages placement of application deployment instances across a federation and thus already knows which datacenter each instance is in, may register a package trigger with a gateway at each datacenter when an application is placed in each datacenter. The datacenter gateway(s) may then search through data packets for registered package properties such as content of a packet header that indicates it is a monitoring packet, and inject additional data according to instructions from the deployment manager. For example, the deployment manager may instruct the gateway(s) to inject a datacenter identifier or a network location identifier to each monitoring data packet. The additional data may be customer-defined and the modified monitoring data including the additional data may be sent to a monitoring system to be analyzed.

18 Claims, 6 Drawing Sheets

(56) References Cited

U.S. PATENT DOCUMENTS

| | | | |
|---|---|---|---|
| 2011/0022812 A1 | | 1/2011 | Linden et al. |
| 2011/0153727 A1* | | 6/2011 | Li .................... G06F 9/5055 709/203 |
| 2011/0231899 A1* | | 9/2011 | Pulier ............. G06F 9/45558 726/1 |
| 2012/0060165 A1 | | 3/2012 | Clarke |
| 2012/0159180 A1 | | 6/2012 | Chase et al. |
| 2012/0311012 A1 | | 12/2012 | Mazhar et al. |
| 2012/0311152 A1 | | 12/2012 | Short et al. |

OTHER PUBLICATIONS

Darrow, "AppFog lets you pick your cloud, (almost) any cloud", http://gigaom.com/2012/07/25/appfog-lets-you-pick-your-cloud-almost-any-cloud/, GIGAOM, Created on Jul. 25, 2012.

Hernandez, "Piston Builds Airframe for OpenStack Private Clouds", Datamation, Created on Aug. 22, 2012.

Kessler, "The Cavium 32 core OCTEON II CN68xx", Cavium—Hotchips 23, pp. 1-33, Created on Aug. 2011.

Kingsbury et al., "Riemann monitors distributed systems", Riemann, Created on Jun. 2013.

Krause, "VMware to Join Cloud Initiative Led by Rackspace", http://news.investors.com/article/623584/201208271147/vmware-joins-cloud-openstack-boosting- rackspace.htm, Investor's Business Daily, Created on Aug. 27, 2012.

Losh, "Tracking Application-Level Metrics in Amara", http://labs.amara.org/2012-07-16-metrics.html, Amara Labs, Created on Jul. 16, 2012.

McMillan, "Netflix to Open Source Army of Cloud Monkeys", http://www.wired.com/wiredenterprise/2012/04/netflix_monkeys/, Created on Apr. 13, 2012.

Miller, "NGINX Exec Talks about Netflix CDN Open Server Deal", http://www.real-user-monitoring.com/nginx-exec-talks-about-netflix-cdn-open-server-deal/, Correlsense, Created on Jun. 8, 2012.

Raleigh, "Red Hat Announces Preview Version of Enterprise-Ready OpenStack Distribution", http://www.redhat.com/about/news/press-archive/2012/8/red-hat-announces-preview-version-of-enterprise-ready-openstack-distribution, Red Hat, Created on Aug. 13, 2012.

Ristenpart et al., "Hey, You, Get Off of My Cloud: Exploring Information Leakage in Third-Party Compute Clouds," in Proceedings of the 16th ACM conference on Computer and Communications Security CCS'09, Nov. 9-13, 2009.

Rubin, "Cloud Federation and the Intercloud", http://cloudcomputing.sys-con.com/node/1249746, Cloud Computing Journal, Posted on Jan. 25, 2010.

Wilhelm, "App monitoring tool Boundary launches a free tier as it partners up with Engine Yard", http://thenextweb.com/apps/2012/08/14/real-time-app-monitoring-tool-boundary-launches-free-tier-product-lands-partnership-engine-yard/, Created on Aug. 14, 2012.

Wiseman, A Remotely Accessible Network Processor-Based Router for Network Experimentation, ANCS'08, pp. 20-29, Nov. 6-7, 2008.

International Search Report and Written Opinion for PCT/US13/37015 filed Apr. 17, 2013, mailed Aug. 30, 2013.

"Actionable insights across your entire application infrastructure", http://boundary.com/wp-content/uploads/2013/05/Boundary-Modern-IT-Ops-White-Paper.pdf, Boundary Product Overview, retrieved on Oct. 20, 2013.

"Data loss prevention software", http://en.wikipedia.org/wiki/Data_loss_prevention_software, Wikipedia, Created Jan. 2007. Retrieved on Oct. 21, 2013.

"Graphite—Scalable Realtime Graphing", http://graphite.wikidot.com/, Graphite, First created on Feb. 26, 2010. Retrieved on Oct. 20, 2013.

"HC23-S1: ManyCore", http://www.youtube.com/watch?v=ZZ2nWq8UK5A, Published on YouTube, Apr. 2, 2012, retrieved on Oct. 21, 2013.

"HP Universal Discovery", http://www8.hp.com/us/en/software-solutions/software.html?compURI=1175751, HP, retrieved on Oct. 21, 2013.

"Network processor", http://en.wikipedia.org/wiki/Network_processor, Wikipedia, Created on Feb. 2005, retrieved on Oct. 20, 2013.

"Symantec Data Loss Prevention", http://www.symantec.com/data-loss-prevention, Data Loss Prevention, Symantec, retrieved on Oct. 21, 2013.

"Nagios is the Industry Standard in IT Infrastructure Monitoring", http://www.nagios.org/, retrieved on Oct. 20, 2013.

"The OpenStack Summit", http://www.openstack.org/, Nov. 5-8, 2013. Retrieved on Oct. 20, 2013.

"Simple daemon for easy stats aggregation", GitHub, https://github.com/etsy/statsd/, retrieved on Oct. 20, 2013.

* cited by examiner

DATACENTER BORDER-ISSUED ANALYTICS FOR MONITORING FEDERATED SERVICES

This Application is the U.S. National Stage filing under 35 U.S.C §371 of PCT Application Ser. No. PCT/US13/37015 filed on Apr. 17, 2013. The PCT Application is herein incorporated by reference in its entirety.

BACKGROUND

Unless otherwise indicated herein, the materials described in this section are not prior art to the claims in this application and are not admitted to be prior art by inclusion in this section.

A federated datacenter (also called datacenter federation) is the deployment and management of multiple external and internal data computing services. With the proliferation of datacenter federations employing software defined networking (SDN), datacenter intermediation layers may allow applications to transparently migrate and distribute among multiple private and public clouds. The trend is getting stronger with standardization of open-source cloud-based infrastructure. Public clouds and enterprise-ready private operating distributions may allow deployments to easily span from private to public clouds. Cloud users may soon be able to launch the component instances of their deployments across private and public clouds, spanning federations of clouds. When combined with SDN, the process may become invisible to the applications and deployment modules can be moved and provisioned wherever desired for reasons of speed, data location, cost, customer proximity, etc.

Current datacenter analytics may include easy data transmission techniques from within programming code by sending a message containing data, but the analytics typically do not have the ability to record from which datacenter the messages are originating or when messages between deployment instances pass between datacenters. Moreover, datacenter analytics typically have meaning local to each datacenter. Thus, applications with a federated deployment across multiple datacenters may have ambiguous, erroneous, or conflicting data.

SUMMARY

The present disclosure generally describes techniques for providing datacenter border-issued analytics for monitoring federated services.

According to some examples, a method is provided for providing datacenter border-issued analytics for monitoring federated services. The method may include receiving instructions associated with modifying monitoring data from a deployment manager. The method may also include embedding modification data into monitoring data, wherein the modification data indicates one or more of a processor, a server, and a datacenter associated with a portion of a deployment. The method may further include receiving modified monitoring data from the portion of the deployment and providing the modified monitoring data to a monitoring system.

According to other examples, a datacenter gateway operable to provide datacenter border-issued analytics for monitoring federated services is described. The datacenter gateway may include one or more layers of network processors. The network processors may be configured to receive instructions associated with modifying monitoring data from a deployment manager. The network processors may also be configured to embed modification data into monitoring data, wherein the modification data indicates one or more of a processor, a server, and a datacenter associated with an instance of a deployed application. The network processors may further be configured to receive modified monitoring data from the instance of the deployed application and provide the modified monitoring data to a monitoring server.

According to further examples, a cloud-based datacenter operable to provide datacenter border-issued analytics for monitoring federated services is described. The cloud-based datacenter may include a deployment manager server configured to manage placement of deployment instances across a federation of datacenters. The deployment manager server may also be configured to register a package trigger with a gateway at each federated datacenter when an application instance is placed at each federated datacenter. The cloud-based datacenter may also include the gateway configured to receive instructions associated with modifying monitoring data from the deployment manager server and analyze received data packets for registered package properties and determine monitoring data packets. The gateway may also be configured to inject one or more additional data fields to a packet header of each monitoring data packet according to the instructions of the deployment manager server and receive modified monitoring data from deployment instances.

According to yet further examples, a computer-readable storage medium is described with instructions stored thereon, which when executed on one or more computing devices may execute a method for providing datacenter border-issued analytics for monitoring federated services. The method may include registering packet indicia to trigger modification of data packets and enabling embedding of modification data into monitoring data. The modification data may indicate one or more of a processor, a server, and a datacenter associated with a portion of a deployment. The method may also include receiving modified monitoring data from the portion of the deployment and providing the modified monitoring data to a monitoring server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
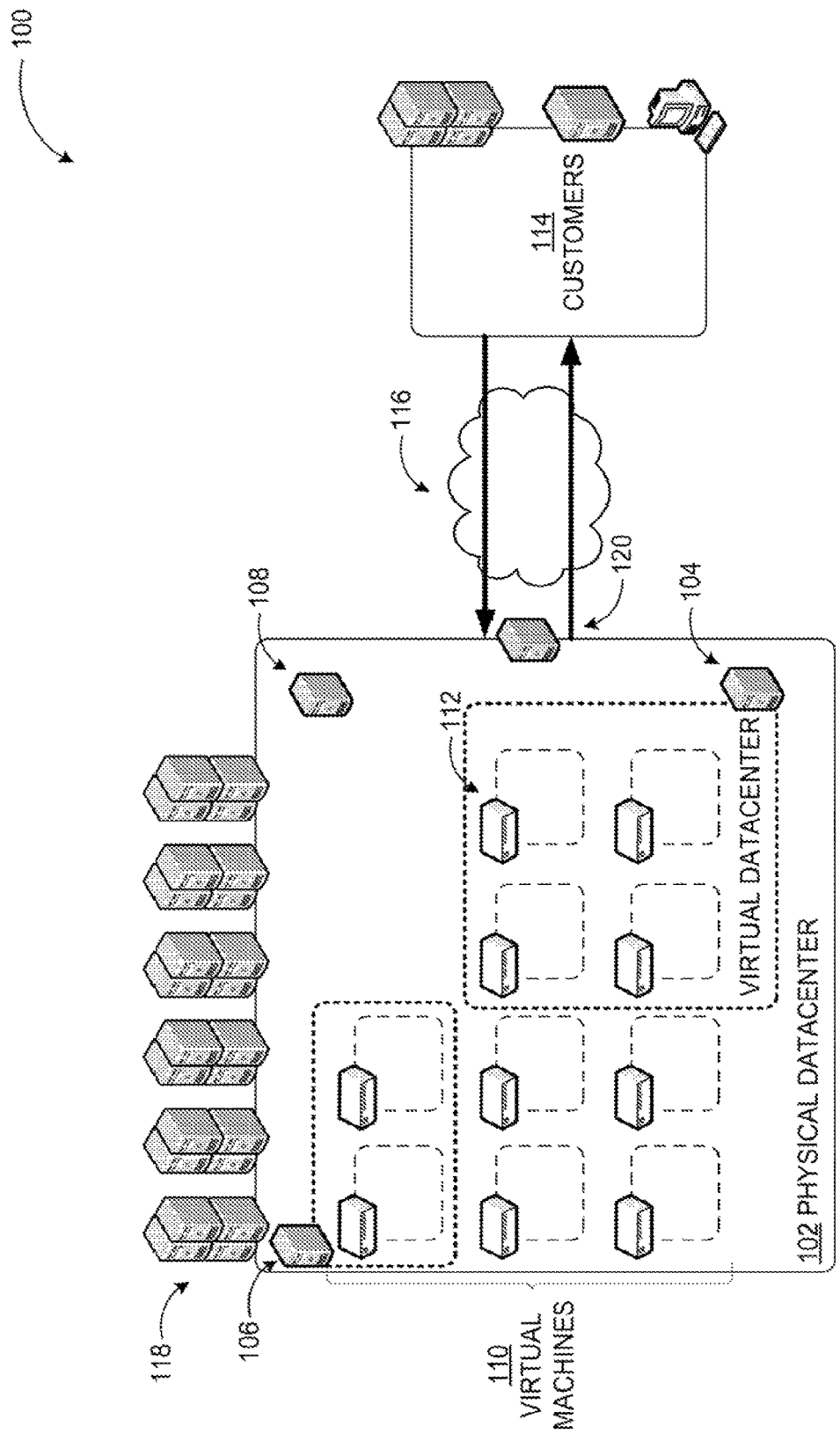
FIG. 1 illustrates an example datacenter, where datacenter border-issued analytics for monitoring federated services may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to datacenter border-issued analytics for monitoring federated services.

Briefly stated, technologies are generally described for providing datacenter border-issued analytics for monitoring federated services. In some examples, a deployment manager, which manages placement of application deployment instances across a federation and thus already knows which datacenter each instance is in, may register a package trigger with a server at each datacenter when an application is placed in each datacenter. The datacenter server(s) may then search through data packets for registered package properties such as content of a packet header that indicates it is a monitoring packet, and inject additional data as the data packet passes through a datacenter border or gateway according to instructions from the deployment manager. For example, the deployment manager may instruct the datacenter server(s) to inject a datacenter identifier or a network location identifier to each monitoring data packet. The additional data may be customer-defined and the modified monitoring data including the additional data may be sent to a monitoring system to be analyzed.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. Customers may also be internal customers of an organization, for example, departments with an organization that share the services of a datacenter operated by the organization (e.g., company). An example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach as described herein is that customers like the retail service may move their hosted services/applications from one datacenter to another without the users noticing a difference.

Package properties as used herein refer to data packet properties such as a protocol associated with a data packet, a length of the data packet, one or more tag identifiers in the data packet, and similar ones. Communication between servers in a datacenter and between different datacenters is facilitated through exchange of data packets. Different types of data packets may be used for various types of purposes. For example, monitoring data packets may be used between a datacenter server and a monitoring system to communicate to the monitoring system server information such as server health, load situation, available ports, and comparable information. Monitoring packets may be identified as such through an indication in each data packet such as a destination address associated with a monitoring system or other means. A package trigger as used herein refers to data packet indicia that may trigger modification of monitoring data packets through injection of additional data as described herein. A deployment manager may register such packet indicia with a datacenter server or gateway at the border of the datacenter to trigger identification of a monitoring data packet and injection of instructed data into the monitoring data packet (i.e., modify the monitoring data packet) as the packets pass through one or more datacenter borders or gateways. For example, a registered package trigger may be a packet header that indicates monitoring data based on a destination of the monitoring server and/or format indicators. Other example package triggers may include packet contents such as XML headers, tags, or identification numbers. Package triggers may be optimized for efficient detection depending on the network scanning of the data center in use.

FIG. 1 illustrates an example datacenter, where datacenter border-issued analytics for monitoring federated services may be implemented, arranged in accordance with at least some embodiments described herein.

As shown in a diagram 100, a physical datacenter 102 may include one or more physical servers 104 or 106, each of which may be configured to provide one or more virtual machines 110. For example, the physical servers 104 and 106 may be configured to provide four virtual machines and two virtual machines, respectively. In some embodiments, one or more virtual machines may be combined into one or more virtual datacenters. For example, the four virtual machines provided by the physical server 104 may be combined into a virtual datacenter 112. The virtual machines 110 and/or the virtual datacenter 112 may be configured to provide cloud-related data/computing services such as various applications, data storage, data processing, or comparable ones to a group of customers 114, such as individual users or enterprise customers, via a cloud 116. Within the physical datacenter there may also be one or more application servers 118 that may deploy application instances to a datacenter server (e.g., server 104 or server 106). A datacenter server 120 or a gateway, as illustrated, may reside at the border of the datacenter and perform actions associated with incoming and outgoing communications such as embedding the modification data into monitoring data packets as the packets pass through one or more datacenter borders or gateways in some examples.

When an application instance is deployed from the one or more application servers 118 to the datacenter server 104 or the datacenter server 106, monitoring data may be sent from the application servers 118 (or servers 106, 108) to a monitoring server outside the datacenter borders through the datacenter server 120 or 108 (acting as gateways) in one or more data packets as part of regular communications between the servers. After receiving a registered package trigger from a deployment manager within a datacenter, the datacenter server 120 may analyze the one or more data packets to identify monitoring data based on one or more data packet properties defined by the registered package trigger. Once the monitoring data packets to be modified are identified, additional data fields may be embedded into the monitoring data packets as the data packets pass through a datacenter border or gateway. The additional data fields may indicate specific hardware and datacenters each portion of a deployment is in, for example. The additional data may include current deployment location, provisioning status, service level agreement (SLA) data, a type of underlying hardware, and/or a proximity to one or more data repositories. The additional data fields may be defined by a customer and provided to the datacenter server based on the deployment manager's instructions. As a result, a customer may have control over what data associated with the deployed application instance may be monitored through one or more datacenters and across public and private clouds, spanning federations.

The above approach for implementing datacenter border-issued analytics to user analysis tools for monitoring federated services may compare against log-based matching, which may not include information reflecting the current federated locations of the various service elements. Log-based matching may also not be robust against existing software solutions that have to be installed specifically with custom configurations on each machine, making them inconsistent with datacenter instance migration and file mirroring best practices. The approaches for implementing datacenter border-issued analytics for monitoring federated services described herein may be a standards-free and secure way to add application instance location data to federated deployment monitoring that allows customers to control the added data without need for modification of applications or monitoring systems.

To expound further, the approaches described herein may be implemented at a single datacenter without standards. The approaches described herein may also be implemented at different datacenters with variations in implementation while still remaining transparent and not involving modifications to the applications or monitoring server. The variations in implementation may include different available data for injection, different points in the packet flow, etc. If a federated deployment is across a private cloud and multiple public clouds and one of the public clouds does not offer such a service then adequate data may still be collected because the data stream without injected labels is from that last less-equipped datacenter.

A general security concern with approaches that provide current deployment location and/or provisioning status may be potential cloud cartography. Cloud cartography is mapping of data center assignments in a physical hardware sense and finding ways to have a virtual machine (VM) assigned to a target destination. Any competing approach based on a datacenter application programming interface (API) that provides absolute location information, even at the datacenter level, may be an asset to attackers of federated clouds. Once the relevant datacenter is known, the attacker may spend little effort to scatter instances of their sniffer application(s) around the datacenter to map the datacenter and attempt co-location of their sniffer application(s) with legitimate customer applications in order to retrieve sensitive data such as user information. Upon determining that such an API is available, instance corruption, replay attacks, or scripting attacks may be used to either force the instance to make the call or to extract the data from wherever the instance may store the data. Example embodiments for providing datacenter border-issued analytics for monitoring federated services may not need such an API and may not need the application to have any knowledge of location or borders at all. Such information may not even be included in the network messages containing monitoring data and may be held by a gateway and deployment manager until the information is added to the modified monitoring data. Having location information in the gateway and the deployment manager may not be an additional security risk as those modules already contain such location information inherently, but may be substantially more secure than application instances. The approaches described herein may also allow each customer to control how much deployment location data is collected in the modified monitoring data, enabling the addition of anything from highly detailed information to just general service level agreement (SLA) or zone information, so that the customer may design their own security levels.

Figure 2:
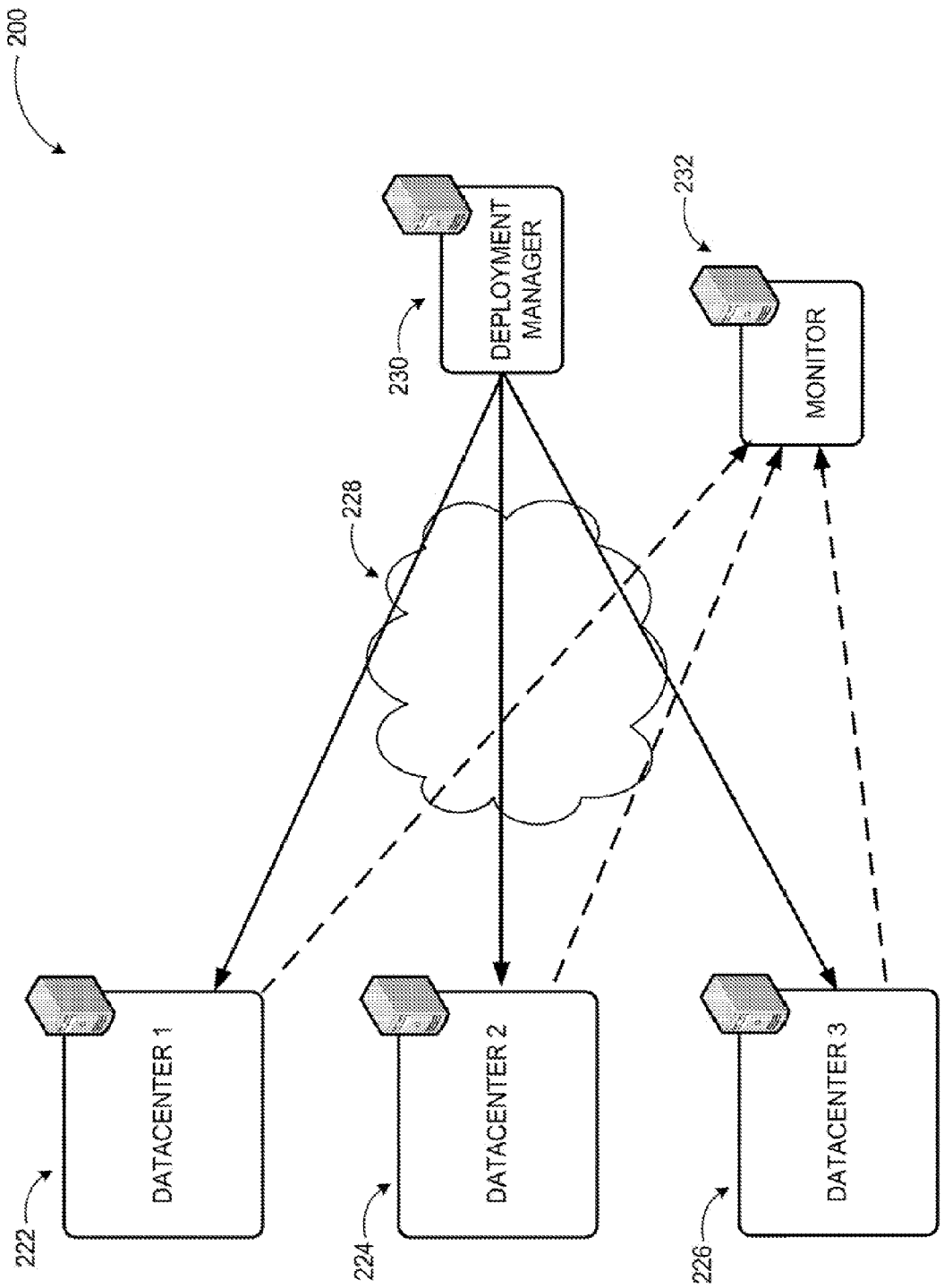
FIG. 2 illustrates an example multiple datacenter-based system, where datacenter border-issued analytics for monitoring federated services may be implemented.

FIG. 2 illustrates an example multiple-datacenter based system, where datacenter border-issued analytics for monitoring federated services may be implemented, arranged in accordance with at least some embodiments described herein.

As shown in a diagram 200, one or more datacenters such as a datacenter 1 222, a datacenter 2 224, and a datacenter 3 226, may comprise a datacenter federation. The datacenter federation may be configured to provide cloud-related data/computing services such as various applications, data storage, data processing, or comparable ones via a cloud 228. A deployment manager 230 may track placement of deployment instances across the datacenter federation and may provide instructions, defined by a customer, to each federated datacenter when an application instance is placed at each federated datacenter. Monitoring data from the application instance may be modified according to the provided instructions and sent to a monitoring server 232 to be analyzed. Monitoring server 232 and deployment manager 230 may reside in one of the datacenters shown or at another computing location.

Any of numerous datacenter-native tools may be used to aggregate and process performance statistics in support of application level monitoring. The datacenter-native tools may gather monitoring data and provide the data to servers where the data can be visualized, acted upon by management logic, or requested by other services. Such tools may operate in a message-server format with instrument emitters within applications and environments that send messages to statistics servers. The message-server format may be compliant with datacenter best practices and may continue to work within federated data center deployments, but the message-server format may be missing data that may impair management and analysis if there is no way to track which federation element a particular piece of data comes from. Conventional tools may typically assume a static deployment placement and may not detect or track migration between datacenters, changes in communication topology, or which datacenter a module is in.

A datacenter function offering data on instance localization may solve multi-datacenter deployment problems. Such a solution may demand widespread agreement on a standard for such data. Any concerns about different levels of cloud cartography security worries among different users may need to be addressed, making the standard complex. Moreover, applications may have to be rewritten to collect and include the additional data in monitoring data messages.

Previous approaches addressing the above problem included placing a machine-specific probe configuration at each computer which, in a federated datacenter environment, may need modification of each instance during deployment or migration and extensive cross-datacenter standards. Embodiments may allow any single datacenter to offer the solution and different datacenters with different versions to work together. If different datacenters have different standards or lack support for the entity that needs to know, the deployment manager may already perform datacenter-specific tracking and management. The approach presented here may also allow customers to manage localization information as they see fit, make efficient use of existing hardware, work in a software defined networking (SDN) environment, and may not need the rewriting of applications.

Figure 3:
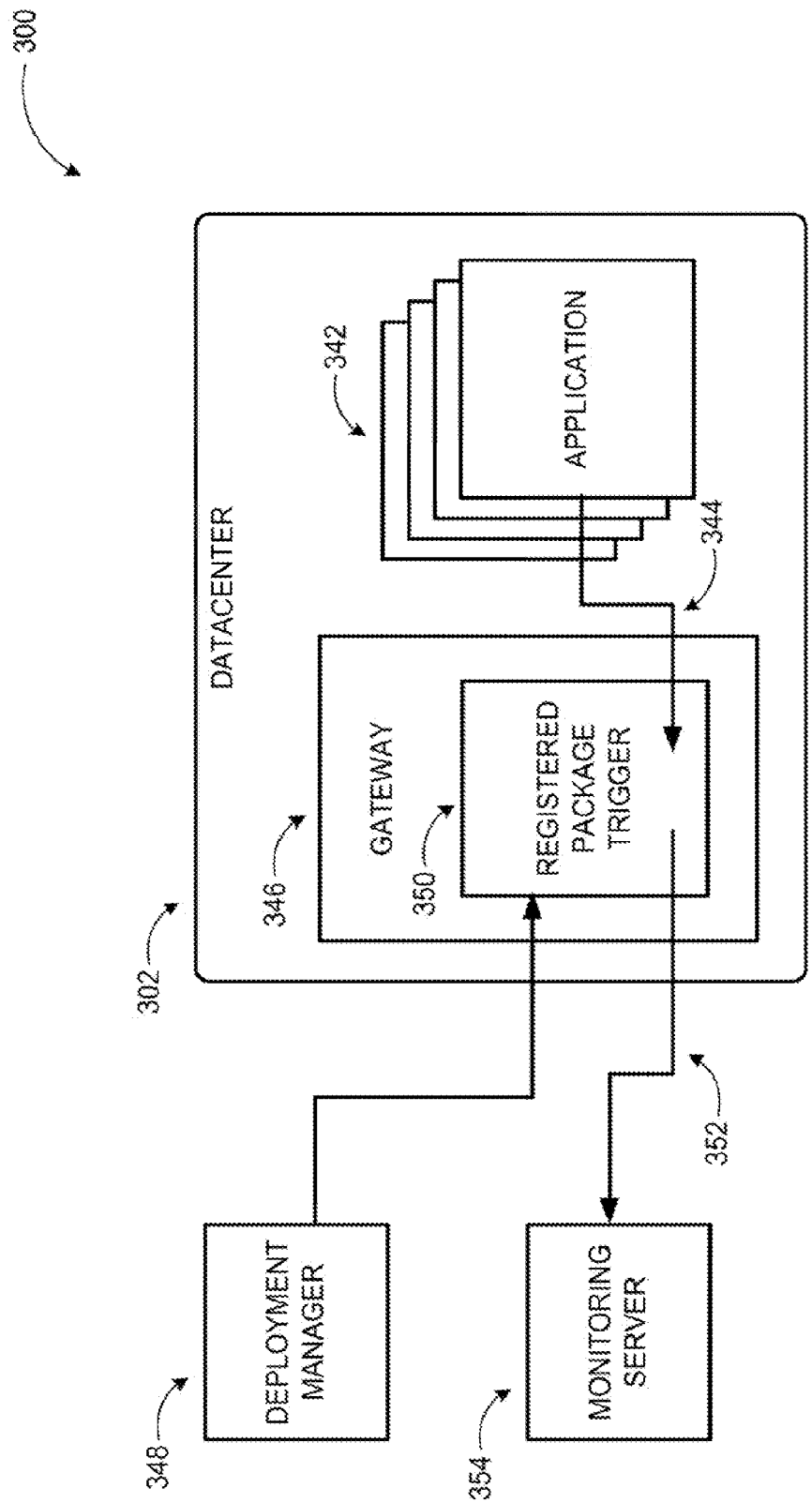
FIG. 3 illustrates a block diagram of a system for providing datacenter border-issued analytics for monitoring federated services.

FIG. 3 illustrates a block diagram of a system for providing datacenter border-issued analytics for monitoring federated services may be implemented, arranged in accordance with at least some embodiments described herein.

As shown in a diagram 300, a datacenter 302 may include one or more applications 342. Upon deployment, an application instance may send monitoring data 344 in the form of one or more data packets to a monitoring server 354 through a gateway 346. In response to the deployment or migration, a deployment manager 348 may register a package trigger 350 with the gateway 346, allowing the gateway 346 to analyze the data packets for registered package properties to identify monitoring data. As the data packets pass through a datacenter border or gateway, the gateway 346 may inject additional data fields according to instructions provided by the deployment manager 348. For example, if the monitoring data is XML, the monitoring server may inject additional data fields including a datacenter ID or network location ID by inserting text such as "<DatacenterID>1733302</DatacenterID>". The modified monitoring data may then be sent (352) to the monitoring server 354 to be analyzed.

Upon identifying the monitoring data within a data packet, the gateway 346 may inject additional data fields into one or more monitoring data packets according to the instructions of the deployment manager 348, which may be defined by a customer preference. The injected data fields may include a datacenter identifier and/or a network location identifier to indicate current deployment location and/or provisioning status. The injected data fields may also include data to indicate service level agreement (SLA) data, infrastructure performance or state, a type of underlying hardware, and/or a proximity to one or more data repositories to modify the monitoring data. The gateway 346 may further map datacenter hardware to contents of the packet header of the one or more monitoring data packets into which additional data fields were injected. As a result, location and other additional data now associated with a deployed application instance may be monitored spanning across a datacenter federation.

The gateway 346 may include one or more layers of network processors. The layers of network processors may include session border controllers, border gateways, load balancers, multiservice security gateways, or other similar products. These processors may include matching engines for rapidly matching patterns in packet headers or data packets themselves. Such network processors may be used for data loss prevention, packet routing, software defined networking (SDN), and other purposes and are commonly found at a gateway or border. The gateway 346 does not need to have a network processor but may have one and may also be implemented at the level of SDN, networking, border gateway, session manager, data loss prevention plane, or even a security plane. The gateway 346 may also be configured to port in accelerators, software patches to be applied to virtual machines executing the accelerators, and/or a hardware map that maps different types of processors to the accelerators based on the received instructions.

The deployment manager 348 may register packet indicia that may trigger modification of data packets. For example, the registered package trigger may be a packet header that indicates monitoring data based on destination of the monitoring server and format indicators. The registered change may be the addition of a simple string at a predetermined location like the end of the packet, for example adding a datacenter ID field. The string may include a datacenter identifier and/or a network location identifier field.

The deployment manager 348 may employ an application wrapper to provide instructions to the gateway 346 via the packet indicia to trigger modification of the data packets. Application wrapping is the process of applying a management layer to an application (e.g. a mobile application) without requiring any changes to the underlying application. Application wrapping may allow an application management administrator to set specific policy elements that can be applied to an application or group of applications. Policy elements may include such things as whether or not user authentication is necessary for a specific application, whether or not data associated with the application can be stored locally, and whether or not specific application programming interfaces (APIs) such as copy and paste or file sharing will be allowed. In a datacenter, application wrapping may allow an administrator to take an application instance, associate extra security and management features with the application instance, and re-deploy the application instance as a single containerized program in a federation of datacenters.

As a result of application wrapping, the deployment manager 348 may provide instructions to the gateway 346 to inject any additional data to monitoring data as the data packets pass through a datacenter border or gateway like the XML data fields example discussed above. Such data may usefully include any number of details such as current location, provisioning status service level agreement (SLA) data if altered by provisioning, types of underlying hardware, proximity to various data repositories, or nearly anything else that the deployment manager may want to include in modified monitoring data.

Upon injection into a packet header of one or more monitoring data packets, the additional data fields may modify monitoring data, which may then be provided to and analyzed by a monitoring server 354 within a monitoring system. For many monitoring servers, there may not need to be a predefined format and adding the simple string to generate modified monitoring data may add the relevant data to the data monitoring infrastructure to be analyzed. The monitoring server may analyze the modified monitoring data for information associated with a current deployment location, a provisioning status, SLA data, a type of underlying hardware, and/or a proximity to one or more data repositories.

The examples in FIGS. 1 through 3 have been described using specific systems and processes in which providing datacenter border-issued analytics for monitoring federated services may be implemented. Embodiments for providing datacenter border-issued analytics for monitoring federated services are not limited to the systems and processes according to these examples.

Figure 4:
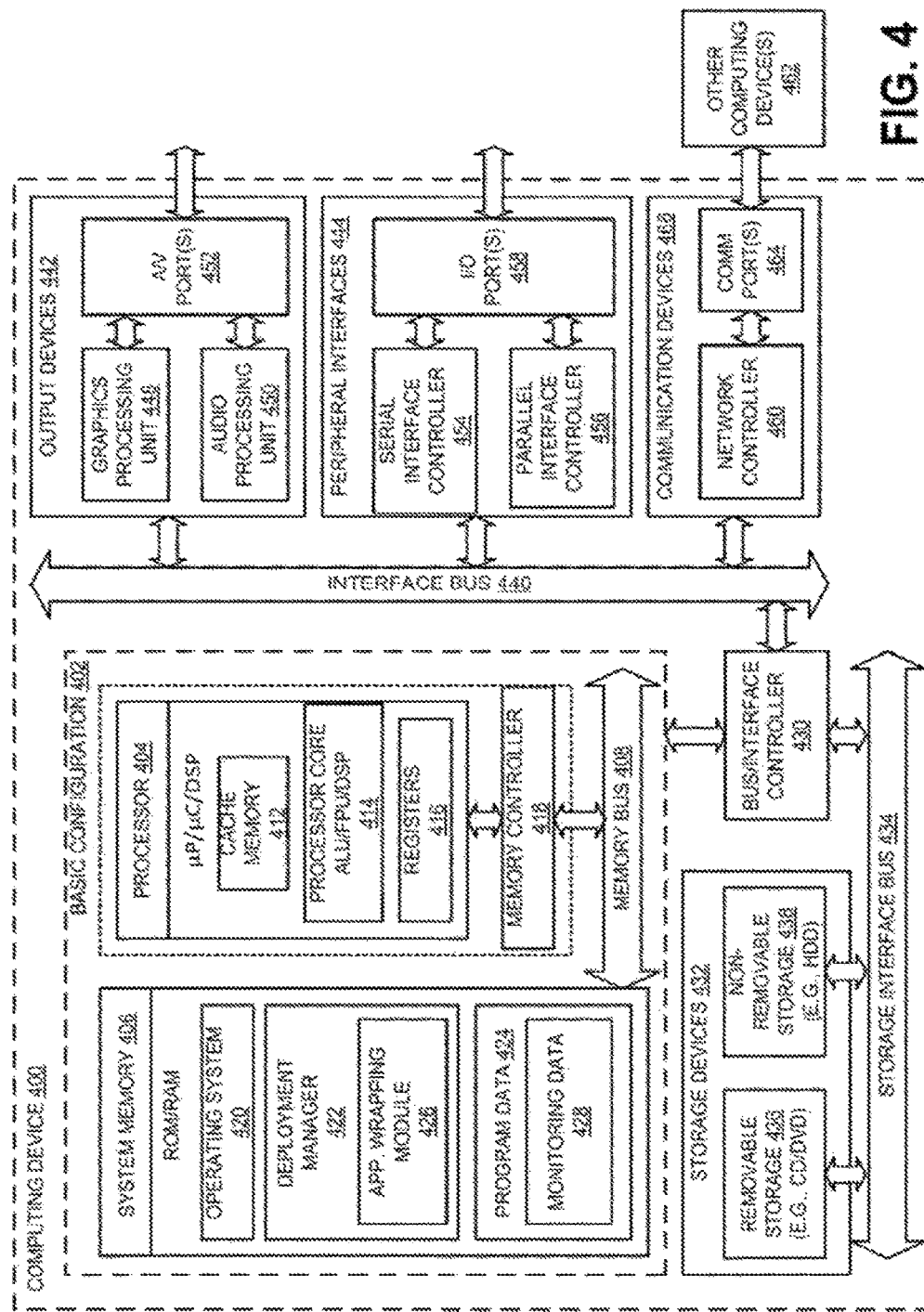
FIG. 4 illustrates a general purpose computing device, which may be used to register a packet trigger, provide instructions to a gateway for modifying monitoring data upon application deployment within the datacenter.

FIG. 4 illustrates a general purpose computing device, which may be used to register a packet trigger, provide instructions to a gateway for modifying monitoring data upon application deployment within the datacenter, arranged in accordance with at least some embodiments described herein.

For example, the computing device 500 may be used to provide datacenter border-issued analytics for monitoring federated services as described herein. In an example basic configuration 402, the computing device 500 may include one or more processors 404 and a system memory 406. A memory bus 408 may be used for communicating between the processor 504 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a deployment manager 422, and program data 424. The deployment manager 422 may include an application wrapping module 426 to provide instructions to a datacenter gateway to modify monitoring data of a deployed application instance. The program data 424 may include, among other data, monitoring data 428 associated with one or more federated datacenters, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for providing datacenter border-issued analytics for monitoring federated services. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by preselected criteria that may be machine automated.

Figure 5:
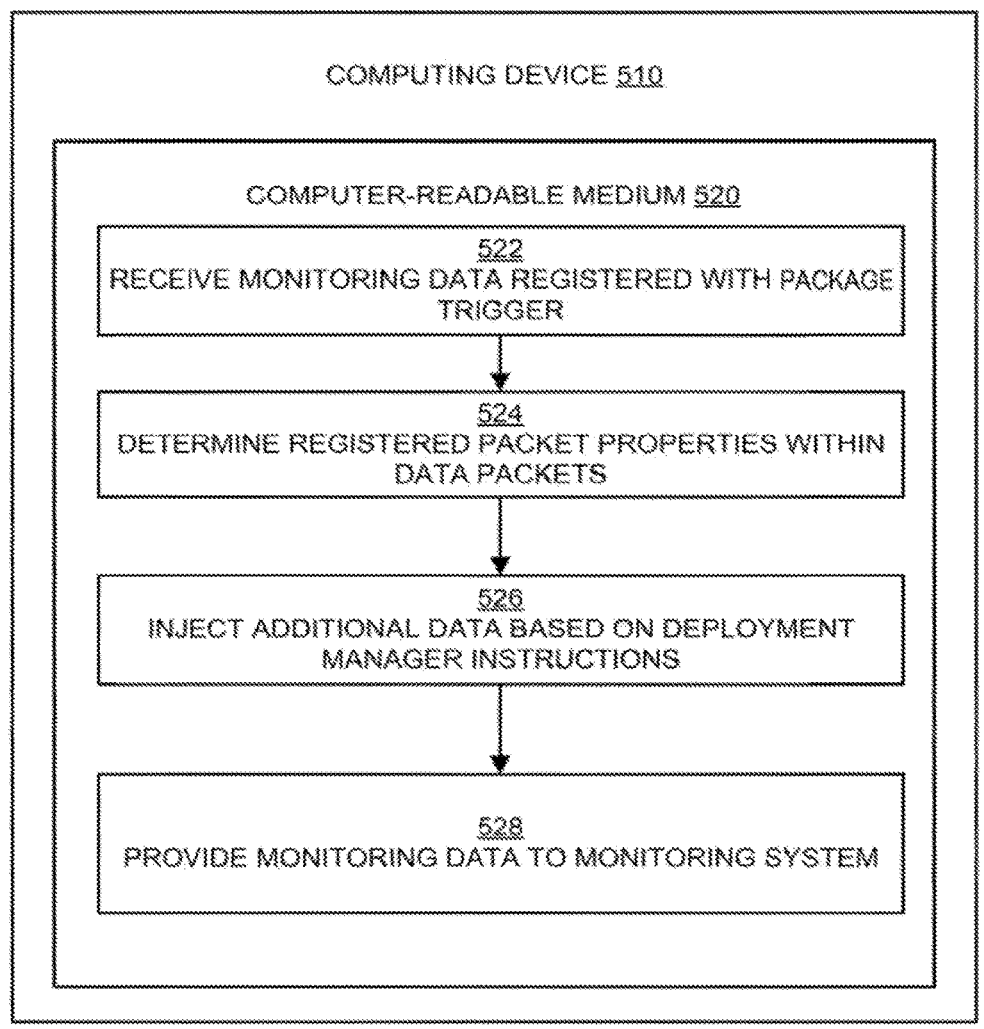
FIG. 5 is a flow diagram illustrating an example method for providing datacenter border-issued analytics for monitoring federated services that may be performed by a computing device such as the computing device in FIG. 4.

FIG. 5 is a flow diagram illustrating an example method for providing datacenter border-issued analytics for monitoring federated services that may be performed by a computing device such as the computing device in FIG. 4, arranged in accordance with at least some embodiments described herein.

Example methods may include one or more operations, functions or actions as illustrated by one or more of blocks 522, 524, 526 and 528, and may in some embodiments be performed by a computing device such as the computing device 400 in FIG. 4. The operations described in the blocks 522-528 may also be stored as computer-executable instructions in a computer-readable medium such as a computer-readable medium 520 of a computing device 510.

An example process for providing datacenter border-issued analytics for monitoring federated services may begin with block 522, "RECEIVE MONITORING DATA REGISTERED WITH PACKAGE TRIGGER", where the gateway 346 at a datacenter border may receive monitoring data destined to a monitoring system associated with an application instance has been deployed to a server within the datacenter.

Block 522 may be followed by block 524, "DETERMINE REGISTERED PACKET PROPERTIES WITHIN DATA PACKETS", where the gateway 346 may analyze the one or more data packets to determine registered packet properties, such as a packet header that may indicate the packet is a monitoring data packet.

Block 524 may be followed by block 526, "INJECT ADDITIONAL DATA BASED ON DEPLOYMENT MANAGER INSTRUCTIONS", where additional data fields may be injected into a packet header of one or more data packets indicated as a monitoring data packet as the data packets pass through the datacenter border or gateway. The additional data fields injected may be according to a deployment manager's instructions, defined by a customer preference. The additional data fields may indicate which specific hardware and datacenters each portion of a deployed application instance is in, for example.

Block 526 may be followed by block 528, "PROVIDE MONITORING DATA TO MONITORING SYSTEM", where the monitoring data modified with injected data fields may be provided to a monitoring system to be analyzed.

Figure 6:
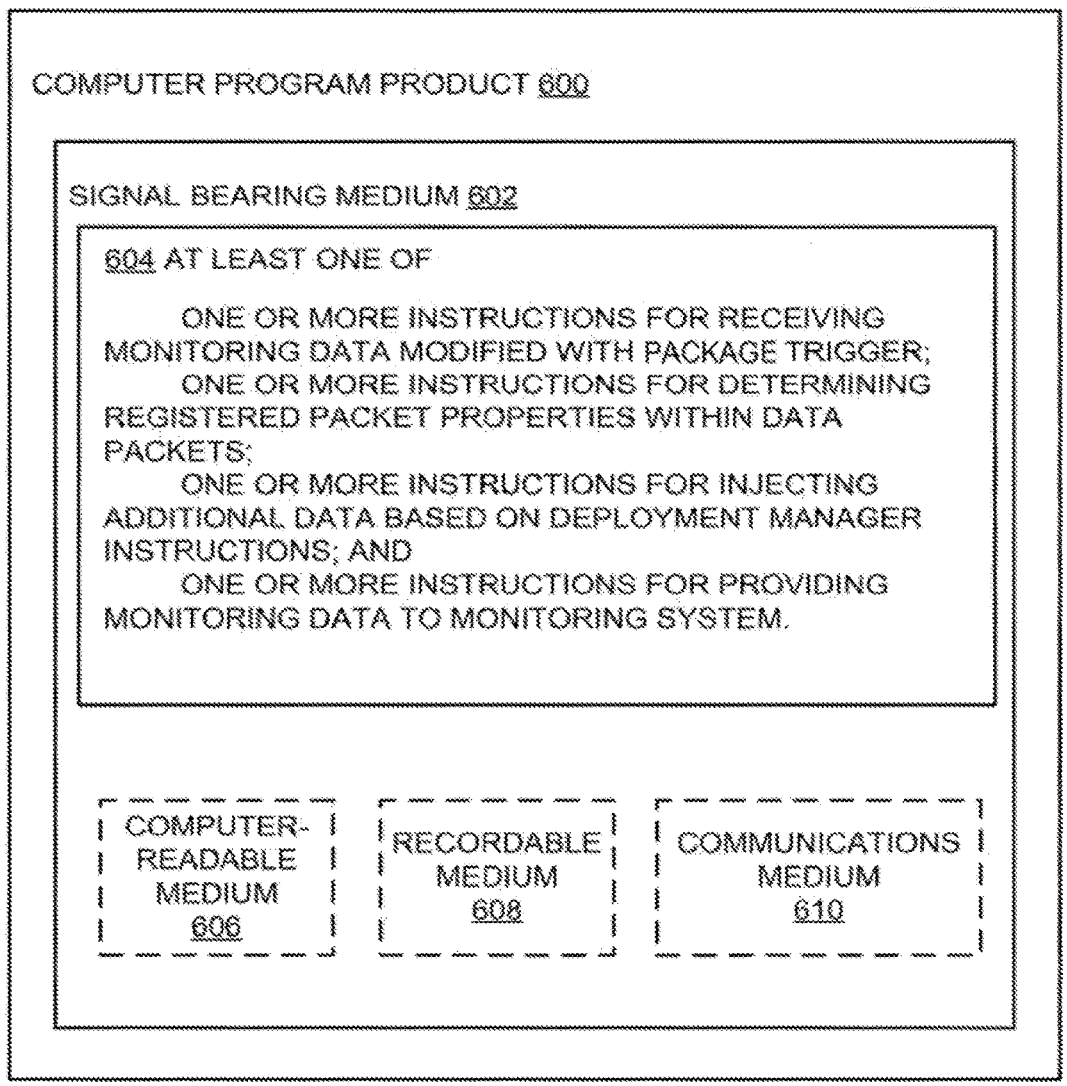
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the deployment manager 422 and the application wrapping module 426 may undertake one or more of the tasks shown in FIG. 6 in response to the instructions 604 conveyed to the processor 404 by the signal bearing medium 602 to perform actions associated with providing datacenter border-issued analytics for monitoring federated services as described herein. Some of those instructions may include, for example, receiving monitoring data registered with package trigger, determining registered packet properties within data packets, injecting additional data based on deployment manager instructions, and providing monitoring data to monitoring system, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by the wireless communications medium 610 (for example, a wireless communications medium conforming with the IEEE 802.11 standard).

According to some examples, a method is provided for providing datacenter border-issued analytics for monitoring federated services. The method may include registering packet indicia to trigger modification of data packets and receiving monitoring data from a portion of a deployment. The method may also include enabling embedding of modification data into monitoring data, where the modification data indicates one or more of a processor, a server, and a datacenter associated with the portion of the deployment. The method may further include providing the modified monitoring data to a monitoring server.

According to other examples, embedding the modification data may include injecting the modification data into monitoring data packets as the packets pass through one or more datacenter borders or gateways. Definition of the modification data embedding may be enabled based on a user preference through the instructions. The embedded modification data may be used to collect information associated with one or more of a current deployment location and a provisioning status. The embedded modification data may be further used to collect information associated with one or more of service level agreement (SLA) data, a type of underlying hardware, and a proximity to one or more data repositories. A security level design may be enabled via definition of one or more of a type and an amount of deployment location data to be collected in the modified monitoring data.

According to further examples, embedding of the modification data may be implemented into the monitoring data at a single datacenter. Embedding of the modification data may also be implemented into the monitoring data at different datacenters with one or more variations in implementation. The variations may include one or more of different available data for embedding and different points in a packet flow while embedding of the modification data into the monitoring data remains transparent to an executed application and the monitoring system. Embedding of the modification data may be implemented into the monitoring data across a private cloud and multiple public clouds, wherein the portion of deployment is an instance of an executed application.

According to some embodiments, a datacenter gateway operable to provide datacenter border-issued analytics for monitoring federated services is described. The datacenter gateway may include one or more of network processors configured to receive instructions associated with modifying monitoring data from a deployment manager and receive monitoring data from an instance of a deployed application. The datacenter gateway may also include a general processor configured to embed modification data into the monitoring data, where the modification data indicates one or more of a processor, a server, and a datacenter associated with an instance of the deployed application, and provide the modified monitoring data to a monitoring server.

In other embodiments, the gateway may be configured to analyze received data packets for registered package properties and determine monitoring data packets. The gateway may also be configured to embed the modification data by injecting one or more additional data fields to a packet header of each monitoring data packet according to the instructions of the deployment manager. The injected data fields may include one or more of a datacenter identifier and a network location identifier.

In further embodiments, the gateway may be further configured to map datacenter hardware to contents of packet headers of the monitoring data packets, wherein the hardware includes one of a network processor and a data loss prevention system. The network processors may include matching engines for rapidly matching patterns in monitoring data packets and/or monitoring data packet headers. The gateway may be one of a session border controller, a border gateway, a session aware load balancer, a data loss prevention gateway, and a multiservice security gateway, wherein the gateway is implemented at a software defined network (SDN) level.

According to some examples, a cloud-based datacenter operable to provide datacenter border-issued analytics for monitoring federated services is described. The cloud-based datacenter may include a deployment manager server configured to manage placement of deployment instances across a federation of datacenters and register a package trigger with a gateway at each federated datacenter when an application instance is placed at each federated datacenter. The cloud-based datacenter may further include the gateway, which may be configured to receive instructions associated with modifying monitoring data from the deployment manager server, receive the monitoring data from the deployment instances, analyze data packets in the received monitoring data for registered package properties and determine monitoring data packets, and inject one or more additional data fields to a packet header of each monitoring data packet according to the instructions of the deployment manager server.

In other examples, the gateway may be further configured to forward the modified monitoring data to a monitoring server. The monitoring server may be configured to receive the modified monitoring data from the gateway and analyze the modified monitoring data for information associated with one or more of: a current deployment location, a provisioning status, service level agreement (SLA) data, a type of underlying hardware, and a proximity to one or more data repositories.

In further examples, the deployment manager server may be further configured to employ an application wrapper to provide instructions to the gateway. The gateway may be further configured to port in one or more of accelerators, software patches to be applied to virtual machines executing the accelerators, and a hardware map that maps different types of processors to the accelerators based on the received instructions. The gateway may be one of a session border controller, a border gateway, a load balancer, a data loss prevention gateway, and a multiservice security gateway.

According to some embodiments, a computer-readable storage medium is described with instructions stored thereon, which when executed on one or more computing devices may execute a method for providing datacenter border-issued analytics for monitoring federated services. The method may include registering packet indicia to trigger modification of data packets and receiving monitoring data from a portion of a deployment. The method may also include enabling embedding of modification data into monitoring data, where the modification data indicates one or more of a processor, a server, and a datacenter associated with the portion of the deployment. The method may further include providing the modified monitoring data to a monitoring server.

According to other embodiments, registering the packet indicia to trigger the modification of the data packets may include registering a packet header that indicates monitoring data based on a destination of the monitoring server and/or format indicators. The registered packet indicia may include an addition of a string at a predetermined location in each data packet, wherein the predetermined location includes one of a data packet beginning and an end of a data packet and the string includes one of a datacenter identifier field and a network location identifier field.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide datacenter border-issued analytics for monitoring federated services, the method comprising:
   receiving instructions associated with modifying monitoring data from a deployment from a deployment manager, wherein the instructions include properties of package indicia registered by the deployment manager through an addition of a string that includes a datacenter identifier and a network location identifier field at a predetermined location of monitoring data packets comprising the monitoring data;
   analyzing data packets received from the deployment for the properties of the package indicia to identify the monitoring data packets that comprise the monitoring data;
   embedding modification data into the monitoring data by injecting the modification data into the monitoring data packets as the packets pass through one or more datacenter borders or gateways, wherein the modification data indicates one or more of a processor, a server, and a datacenter associated with the deployment;
   mapping datacenter hardware to contents of the packet headers of the monitoring data packets into which the one or more additional data fields were injected such that a location and other data associated with the deployment are monitored spanning across a datacenter federation, wherein the datacenter hardware includes one of a network processor and a data loss prevention system; and
   providing the modified monitoring data to a monitoring system.

2. The method of claim 1, further comprising:
   enabling definition of the modification data embedding based on a user preference through the instructions.

3. The method of claim 1, further comprising:
   enabling a security level design via definition of one or more of a type and an amount of deployment location data to be collected in the modified monitoring data.

4. The method of claim 1, further comprising:
   implementing embedding of the modification data into the monitoring data at a sir datacenter.

5. The method of claim 1, further comprising:
   implementing embedding of the modification data into the monitoring data at different datacenters with one or more variations in implementation.

6. The method of claim 5, wherein the variations include one or more of: different available data for embedding and different points in a packet flow while embedding of the modification data into the monitoring data remains transparent to an executed application and the monitoring system.

7. The method of claim 1, further comprising:
   implementing embedding of the modification data into the monitoring data across a private cloud and multiple public clouds.

8. The method of claim 1, wherein the deployment is an instance of an executed application.

9. A datacenter gateway to provide datacenter border-issued analytics to monitor federated services, the datacenter gateway comprising:
   one or more of network processors to:
      receive instructions associated with modifying monitoring data from a deployment from a deployment manager, wherein the instructions include properties of package indicia registered by the deployment manager through an addition of a string that includes a datacenter identifier and a network location identifier field at a predetermined location of monitoring data packets comprising the monitoring data; and
      analyze data packets received from an instance of a deployed application for the properties of the package indicia to identify the monitoring data packets that comprise the monitoring data; and
   a general processor to:
      embed modification data into the monitoring data by injecting one or more additional data fields to packet headers of the monitoring data packets as the packets pass through one or more datacenter borders or gateways according to the instructions of the deployment manager, wherein the modification data indicates one or more of a processor, a server, and a datacenter associated with an instance of the deployed application;
      map datacenter hardware to contents of the packet headers of the monitoring data packets into which the one or more additional data fields were injected such that a location and other data associated with the instance of the deployed application are monitored spanning across a datacenter federation, wherein the datacenter hardware includes one of a network processor and a data loss prevention system; and
      provide the modified monitoring data to a monitoring server.

10. The datacenter gateway of claim 9, wherein the additional injected data fields include one or more of the datacenter identifier and the network location identifier.

11. The datacenter gateway of claim 9, wherein the network processors include matching engines for rapidly matching patterns in the monitoring data packets and/or monitoring data packet headers.

12. The datacenter gateway of claim 9, wherein the gateway is one of a session border controller, a border gateway, a session aware load balancer, a data loss prevention gateway, and a multiservice security gateway.

13. The datacenter gateway of claim 9, wherein the gateway is implemented at a software defined network (SDN) level.

14. A cloud-based datacenter to provide datacenter border-issued analytics to monitor federated services, the cloud-based datacenter comprising:
a deployment manager server to:
manage placement of deployment instances across a federation of datacenters; and
register a package trigger with a gateway at each federated datacenter when an application instance is placed at each federated datacenter by registering packet indicia through an addition of a string that includes a datacenter identifier and a network location identifier field at a predetermined location of monitoring data packets comprising monitoring data; and
the gateway to:
receive instructions associated with modifying the monitoring data from the deployment, instances from the deployment manager server, wherein the instructions include properties of the package indicia registered by the deployment manager server;
analyze data packets received from the deployment instances for the properties of the package indicia to identify the monitoring data packets that comprise the monitoring data;
inject one or more additional data fields to a packet header of each monitoring data packet according to the instructions of the deployment manager server; and
map datacenter hardware to contents of the packet header of each monitoring data packet into which the one or more additional data fields were injected such that a location and other data associated with the deployment instances are monitored spanning across a datacenter federation, wherein the datacenter hardware includes one of a network processor and a data loss prevention system.

15. The cloud-based datacenter of claim 14, wherein the gateway further forwards the modified monitoring data to a monitoring server to:
receive the modified monitoring data from the gateway; and
analyze the modified monitoring data for information associated with one or more of: a current deployment location, a provisioning status, service level agreement (SLA) data, a type of underlying hardware, and a proximity to one or more data repositories.

16. The cloud-based datacenter of claim 14, wherein the gateway
further ports in one or more of accelerators, software patches to be applied to virtual machines executing the accelerators, and a hardware map that maps different types of processors to the accelerators based on die received instructions.

17. The cloud-based datacenter of claim 14, wherein registering the package trigger with the gateway at each federated datacenter when the application instance is placed at each federated datacenter by registering packet indicia comprises:
registering a packet header that indicates monitoring data based on a destination of a monitoring server and format indicators.

18. The cloud-based datacenter of claim 14, wherein the predetermined location includes one of a data packet header and an end of a data packet.

* * * * *

UNITED STATES PATENT AND TRADEMARK OFFICE
CERTIFICATE OF CORRECTION

PATENT NO. : 9,515,902 B2
APPLICATION NO. : 14/114732
DATED : December 6, 2016
INVENTOR(S) : Kruglick Page 1 of 1

It is certified that error appears in the above-identified patent and that said Letters Patent is hereby corrected as shown below:

In the Specification

In Column 1, below Title, Line 1, insert -- CROSS-REFERENCE TO RELATED APPLICATION --.

In Column 1, Line 6, delete "§371" and insert -- § 371 --, therefor.

In Column 17, Line 2, delete ""A" or, "B"" and insert -- "A" or "B" --, therefor.

In the Claims

In Column 18, Line 3, in Claim 4, delete "sir" and insert -- single --, therefor.

In Column 19, Line 20, in Claim 14, delete "deployment," and insert -- deployment --, therefor.

Signed and Sealed this
Twenty-fifth Day of April, 2017

Michelle K. Lee
*Director of the United States Patent and Trademark Office*